US008714177B2

(12) United States Patent
Hilton et al.

(10) Patent No.: US 8,714,177 B2
(45) Date of Patent: May 6, 2014

(54) AUTOMATED YIELD MONITORING AND CONTROL

(75) Inventors: Dennis M. Hilton, Nashua, NH (US); Karl Taub, Arlington, MA (US); Keith Lipford, Baltimore, MD (US); Philip A. Zanghi, Franklin, MA (US)

(73) Assignee: W.R. Grace & Co. -Conn., Columbia, MD (US)

( * ) Notice: Subject to any disclaimer, the term of this patent is extended or adjusted under 35 U.S.C. 154(b) by 0 days.

(21) Appl. No.: 13/428,084

(22) Filed: Mar. 23, 2012

(65) Prior Publication Data

US 2012/0180872 A1 Jul. 19, 2012

Related U.S. Application Data

(62) Division of application No. 11/810,506, filed on Jun. 5, 2007, now Pat. No. 8,206,123.

(51) Int. Cl.
*G05D 11/13* (2006.01)

(52) U.S. Cl.
USPC ........................... 137/5; 137/565.13; 118/692

(58) Field of Classification Search
USPC ................ 137/5, 565.13, 565.16; 417/18, 32; 118/692
See application file for complete search history.

(56) References Cited

U.S. PATENT DOCUMENTS

| | | | |
|---|---|---|---|
| 4,616,306 | A | 10/1986 | Kuzma et al. |
| 4,628,861 | A | 12/1986 | Michell |
| 4,734,649 | A | 3/1988 | Barnaby |
| 4,751,024 | A | 6/1988 | Shu et al. |
| 4,904,503 | A | 2/1990 | Hilton et al. |
| 4,934,596 | A | 6/1990 | Hilton et al. |
| 5,034,160 | A | 7/1991 | Kindt et al. |
| 5,203,919 | A | 4/1993 | Bobrowski et al. |
| 5,340,612 | A | 8/1994 | Perito |
| 5,413,819 | A | 5/1995 | Drs |
| 5,520,332 | A | 5/1996 | Gaidis et al. |
| 5,536,151 | A | 7/1996 | Von Eckardstein |
| 5,556,578 | A | 9/1996 | Berneburg et al. |
| 6,033,187 | A | 3/2000 | Addie |
| 6,045,730 | A | 4/2000 | Potter |
| 6,162,288 | A | 12/2000 | Kindt et al. |

(Continued)

FOREIGN PATENT DOCUMENTS

| | | |
|---|---|---|
| DE | 4307379 C1 | 7/1994 |
| JP | 52-125526 | 10/1977 |

(Continued)

OTHER PUBLICATIONS

Backe et al., Characterizing Curing Cement Slurries by Electrical Conductivity, SSPE Drilling & Completion, Dec. 2001, vol. 16, No. 4, pp. 201-207.

(Continued)

*Primary Examiner* — Willliam McCalister
(74) *Attorney, Agent, or Firm* — Baker & Hostetler LLP

(57) ABSTRACT

A system is adapted to automatically maintain a desired yield level for a slurry flow. Measurements of the electrical conductivity of a slurry are taken and corrected for the effects of temperature and pressure. The corrected conductivity measurements are used to arrive at a value for system yield. The system automatically determines if the yield is too high or too low relative to a desired level, and controls the rate at which accelerator is added to the slurry in order to increase or decrease yield.

15 Claims, 9 Drawing Sheets

(56) References Cited

U.S. PATENT DOCUMENTS

| | | | | |
|---|---|---|---|---|
| 6,224,250 | B1 | 5/2001 | Kreinheder et al. | |
| 6,404,204 | B1 * | 6/2002 | Farruggia et al. | 324/441 |
| 6,406,755 | B1 | 6/2002 | Kindt et al. | |
| 6,780,230 | B2 | 8/2004 | Hilton et al. | |
| 2003/0125405 | A1 | 7/2003 | Hilton et al. | |
| 2006/0177590 | A1 | 8/2006 | Abbott et al. | |

FOREIGN PATENT DOCUMENTS

| | | |
|---|---|---|
| RU | 2285119 | 10/2006 |
| WO | WO 01/86274 A1 | 11/2001 |
| WO | WO 03/060018 A2 | 7/2003 |

OTHER PUBLICATIONS

"The Nordoser 900 Accelerator Dosing System", http://www.normet.fi/?PRODUCTS:SPRAYING:The_Nordoser_900_accelerator_dosing_system, Jan. 24, 2005.

The MBT Knowledge Base, MBT-Knowledge Base (p. 35), http://www.mbtaus.com.au.whatsnew/new35, Jan. 31, 2005.

International Search Report dated Mar. 8, 2011 from European Application No. 08770199.1-1253.

International Preliminary Report on Patentability (Chapter I) for PCT/US2006/001737 date Sep. 18, 2007, 5 pages.

International Search Report for PCT/US2006/001737 dated Aug. 23, 2007, 3 pages.

Written Opinion of the International Searching authority for PCT/US2006/001737 dated Aug. 23, 2007, 4 pages.

* cited by examiner

AUTOMATED YIELD MONITORING AND CONTROL

CROSS REFERENCE TO RELATED APPLICATIONS

The present application claims priority to and is a divisional of U.S. patent application Ser. No. 11/810,506 filed on Jun. 5, 2007, the contents of which are hereby incorporated by reference in their entirety. This application is related by subject matter to U.S. patent application Ser. No. 11/335,426 (U.S. Patent Publication No. 2006/0177590), the contents of which are hereby incorporated by reference in their entirety.

FIELD OF THE DISCLOSED EMBODIMENTS

The disclosed embodiments relate to spray application of liquid compositions, and more particularly, to methods and systems for automated monitoring and control of spray application yield.

BACKGROUND

In many industries, and in particular, the construction industry, spray application of liquefied compositions has proven very useful. Materials that previously were applied manually may now be applied in a semi-automated fashion using spray systems. For example, at construction sites it is now common for concrete and fire protection coatings to be applied using spray systems.

Spray systems apply materials in slurry or suspension form which then sets after application. A slurry or suspension is typically derived from a powdered material that is mixed with water and/or other liquids and pumped through a conduit to a spray rig where the slurry is sprayed onto a target surface. For example, in a construction setting, a powdered fireproofing material may be mixed with water at the job-site and a slurry comprising the fireproofing material spray-applied to metal building supports.

The term "yield" is used in connection with spray applications systems to refer to the volume of spray-applied slurry composition, after setting, per given weight of dry binder material used to prepare the settable slurry composition. For example, "yield" may refer to the volume of applied fireproofing composition, after setting, per given weight of dry mix used to prepare the fireproofing composition slurry. Yield may be measured in units of board*feet. Manufacturers, designers, contractors, materials suppliers, and others are often interested in the yield that is achieved during a particular job. For example, contractors and materials suppliers may be interested in achieving a particular yield so as to make efficient use of resources.

It is common for accelerating agents to be introduced into compositions in order to have a desired effect on the output of spray application. For example, some accelerating agents or accelerators have the effect of speeding slurry setting time. In other words, the introduction of an accelerator into a slurry may decrease the time needed for a slurry to set after it has been spray-applied.

An accelerator may also have the effect of increasing yield. An increase in yield may be the result of a chemical reaction that occurs between the accelerator and the slurry. For example, an accelerator may have acidic content that reacts upon introduction into a particular slurry. Depending upon the composition or slurry, the reaction may produce a gas such as carbon dioxide. Carbon dioxide and other gases lead to foaming and an expanded slurry composition. An expanded volume of a foamed slurry mixture translates into increased yield upon spray application.

SUMMARY

Applicants disclose a system that is adapted to automatically maintain a desired yield level for a slurry flow. Generally, yield is directly correlated to the amount of accelerator in a slurry. Thus, as the amount of accelerator in a slurry increases or decreases, so does the yield. Increasing or decreasing accelerator in a slurry also has the effect of increasing or decreasing the electrical conductivity of the slurry. Accordingly, it is possible to monitor the yield level of a system by monitoring the electrical conductivity of the slurry. In the disclosed system, measurements of the electrical conductivity are taken and corrected for the effects of temperature and pressure. The corrected conductivity measurements are used to arrive at a value for yield. The disclosed system automatically determines if the yield is too high or too low relative to a desired level, and controls the rate at which accelerator is added to the slurry in order to increase or decrease yield.

An exemplary system comprises a sensor module and an indicator module. The sensor module comprises sensors that are adapted to measure conductivity, temperature, and pressure in a slurry flow. The indicator module is communicatively coupled to the sensor module and is adapted to receive the measurements from the sensor module and to use those measurements to monitor and correct yield.

In an exemplary embodiment, the sensor module is placed in a flow comprising a slurry and accelerator. The sensor module takes measurements corresponding to conductivity, temperature, and pressure at short intervals and forwards those measurements to the indicator module.

The indicator module is adapted to receive the measurements from the sensor module and to use those measurements to calculate a corrected conductivity that takes into consideration the effects of temperature and pressure on the conductivity measurements. The indicator module uses the calculated value for corrected conductivity to calculate a corresponding value for yield. If the indicator module determines that the yield is not at a desired level, it communicates with a source of accelerator to increase or decrease, as appropriate, the rate at which the accelerator is added to the slurry. For example, if the yield is determined to be lower than the desired level, the indicator module may communicate instructions that cause an increase in the rate at which accelerator is added to the slurry. If the yield is higher than the desired level, the indicator module communicates instructions to decrease the rate at which the accelerator is added to the slurry. Increasing or decreasing the rate at which accelerator is entered into the slurry has the effect of moving the yield toward the desired level.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

In an exemplary embodiment, the system measures conductivity, temperature, and pressure in a slurry. A corrected conductivity is calculated in order to take into account the effect of temperature and pressure on conductivity measurements. The corrected conductivity value is used to derive a value for yield. If the calculated yield is not at a desired level, the rate at which accelerator is added to the slurry is adjusted to increase or decrease the yield as necessary.

Exemplary Environment

Figure 1:
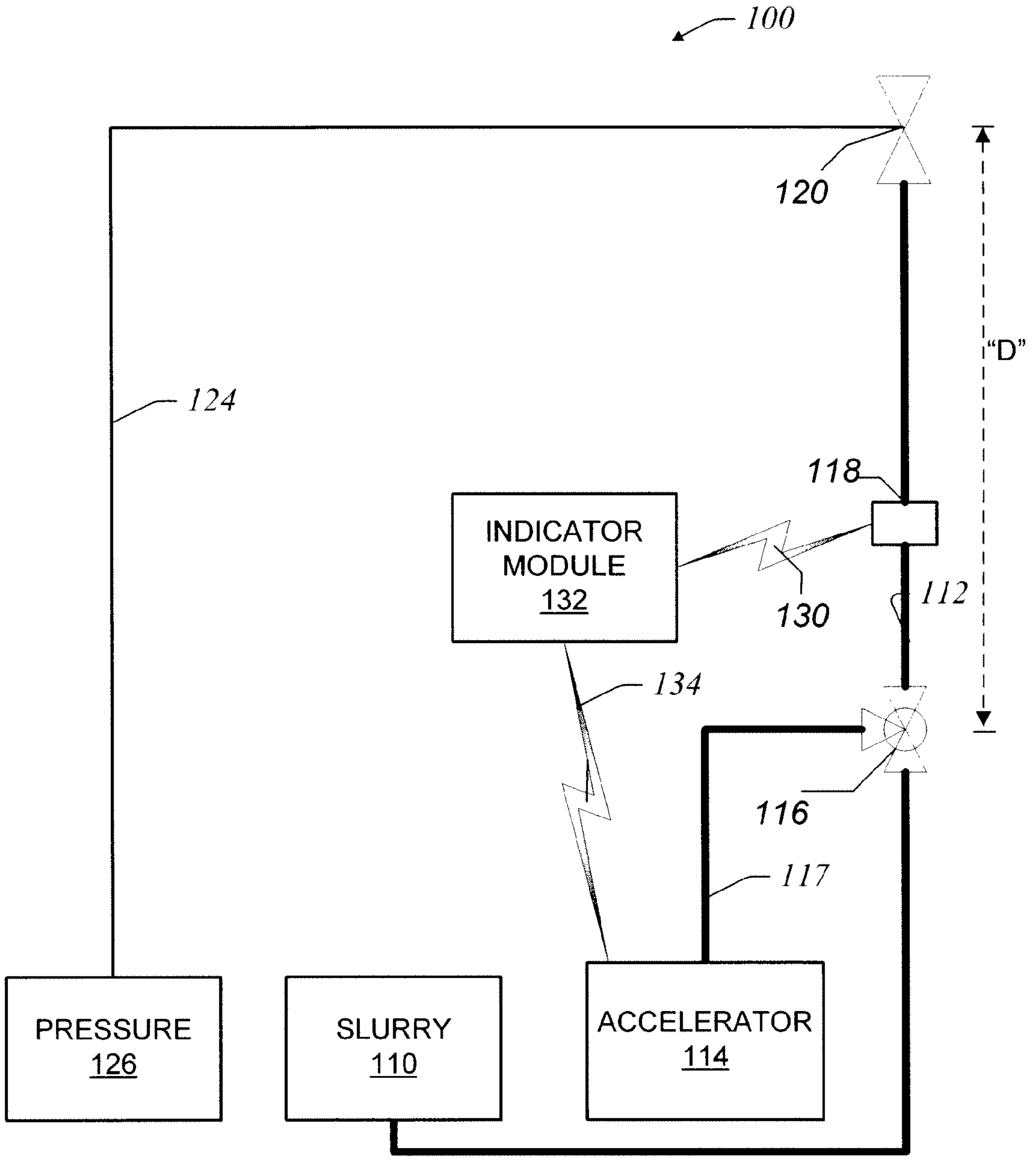
FIG. 1 is a diagram depicting an exemplary spray application system adapted to monitor and automatically control yield level.

FIG. 1 is a diagram depicting an exemplary spray application system 100 adapted to monitor and control the level of accelerator in a spray composition and, in so doing, monitor and control the system yield.

Slurry source 110 provides a flow of a suspension or slurry for spray application to a target surface. Slurry source 110 may comprise, for example, a mixing device that combines a binder material with water or other liquid to provide a settable slurry that is adapted to be pumped. Slurry source 110 may further comprise a pump to move the slurry through conduit 112 toward spray applicator 120. Conduit 112 may be any type of device or material that is adapted to convey the liquid slurry and may be, for example, a hose.

Binder materials that are suitable to create settable slurry compositions comprise, for example, Plaster of Paris, stucco, gypsum, Portland cement, aluminous cement (e.g., a calcium sulphoaluminate cement, a high alumina cement), pozzolanic cement (e.g., finely ground blast furnace slag or fly ash, silica fume), gunite, magnesium oxychloride, magnesium oxysulfate, or mixtures thereof. Exemplary settable slurry compositions are disclosed, for example, in Patent Cooperation Treaty Publication WO 03/060018 and U.S. Pat. Nos. 4,751,024, 4,904,503, 5,034,160, 5,340,612, 5,401,538, 5,520,332, 5,556,578, and 6,162,288, the contents of all of which are hereby incorporated by reference herein.

A wide variety of alternative aggregate and filler materials may be employed within a settable slurry. These include, for example, exfoliated vermiculite, expanded perlite, diatomaceous earth, a refractory filler such as alumina or grog or colloidal silica, ceramic fibers, mineral fibers, glass fibers, common mixed paper waste, paper mill sludge, pulp, cellulose and the like. Agricultural fibers such as fibers extracted from wattle bark, palm fiber, kenaf, reeds, and natural organic particles such as ground cork and sawdust may also be suitable for use in a slurry. Suitable fibers may comprise dry synthetic particles or fibers such as organic particles derived from milled thermoplastic foams, for example, phenol formaldehyde resole resin foams, urea formaldehyde foams, and polyurethane rigid or flexible foams. Organic fibers such as carbon, aramid, polyacrylonitrile, polyvinyl alcohol, polyethylene, polypropylene, polyester, acrylics, and mixtures thereof might also be employed.

An example settable slurry composition suitable for use with the disclosed system is a product sold by W. R. Grace & Co. under the tradename MONOKOTE®. MONOKOTE® is a sprayable fireproofing slurry composition comprising shredded expanded polystyrene, as well as other components including, for example, known set retarding agents (See e.g., U.S. Pat. No. 6,162,288, the contents of which are hereby incorporate by reference).

Referring to FIG. 1, at port 116 an accelerating agent is introduced into the slurry. The accelerating agent is received from accelerator source 114 which is operably coupled to port 116 via conduit 117. Accelerator source 114 may comprise, for example, a reservoir of accelerator and a pump for pumping the accelerator material into the slurry stream. Conduit 117 may be any apparatus suitable for conveying an accelerating agent and may be, for example, a hose. Port 116 may be any system or device that is adapted to receive a flow of accelerator and interject the accelerator into the slurry. A description of methods and systems for injecting accelerator into a slurry are comprised in U.S. patent application Ser. No. 11/335,426 filed Jan. 19, 2006 and titled "High Yield Spray Application," the contents of which are hereby incorporated by reference in their entirety.

Accelerators are generally introduced into the slurry for the purpose of having an effect on the spray output. Often, accelerators are introduced into a slurry in order to increase the rate at which the slurry sets upon application to an intended target surface. As described in U.S. Pat. No. 5,520,332, set accelerators are often low viscosity fluids which are injected into the slurry to decrease its set time upon a substrate. Acidic set accelerating agents capable of satisfactorily offsetting the retardation of the slurry may be used. For most commercial applications, the type and amount of accelerator is that which rapidly converts the setting time from about 4 to 12 hours to about 5 to 10 minutes. The amount required to provide such setting times will vary depending on the accelerator and the type and amount of retarder and binder. Generally, an amount in the range of about 0.1% to 20% by weight of dry accelerator based upon the weight of dry cementitious binder is used, with about 2% being preferred. Examples of useful accelerators include aluminum sulfate, aluminum nitrate, ferric nitrate, ferric sulfate, ferric chloride ferrous sulfate, potassium sulfate, sulfuric acid, and acetic acid, with aluminum sulfate being preferred.

Accelerators may also have the effect of increasing the resulting yield. An increase in yield may result, for example, when the accelerator reacts with the slurry to increase the volume of the slurry. For example, the accelerator may react with the slurry to create a gas, which in turn causes the slurry to foam and thereby increase the volume of the slurry. Such reactions sometimes result where the accelerator comprises an acid which reacts with the slurry to create a gas such as, for example, carbon dioxide. For example, an accelerator may be a water-soluble salt.

For the purpose of generating gas or foam within the slurry, it is sometimes useful to employ a "basic material." The term "basic material" refers to any material which reacts with an acidic accelerating agent to create a gas and related volume expansion of the slurry. Preferably, the basic material is added to the slurry composition and is not naturally occurring in the cementitious binder. Exemplary basic materials that can be added to the slurry binder to generate gas when combined with the set accelerator include, for example, carbonates such as calcium carbonate, sodium carbonate, sodium bicarbonate, or mixtures thereof.

As illustrated in FIG. 1, in an exemplary embodiment, port 116 is located at a distance "D" along conduit 112 from spray applicator or nozzle 120. It is understood that accelerator may be introduced at any distance from spray application 120 including at or in close proximity to applicator 120. In an exemplary embodiment, the distance "D" between the accelerator injection port 116 and spray apparatus 120 is between ten feet and one hundred feet. In another exemplary embodiment, the accelerator is injected between fifteen to seventy-five feet from spray apparatus 120. Locating port 116 at a distance "D" from spraying apparatus 120 allows for an accelerator that is injected into the slurry to react with any basic material contained in the slurry and to generate gas that will increase the yield of the slurry when sprayed and dried on a target substrate.

The mixture of slurry and accelerator is conveyed through conduit 112 and sensor module 118 to spray apparatus 120. Spray apparatus 120 is operably attached to hose 124 which provides a stream of pressurized gas from gas source 126. The pressurized gas propels the slurry from a nozzle of spray apparatus 120 onto a target surface which may be, for example, a steel beam, a panel, or any other surface.

Sensor module 118 is placed in the path of the slurry flow and is adapted to sense various physical properties of the mixture of slurry and accelerator, which may be referred to herein simply as the slurry. Sensor module 118 may take numerous physical forms to obtain measurements of the physical characteristics of the slurry. As explained in detail below in connection with FIG. 3, in an exemplary embodiment, sensor module 118 may comprise a plurality of sensors that communicate with the slurry flow. In an exemplary embodiment, sensor module 118 is adapted to take physical readings corresponding to the electrical conductivity of the slurry, the temperature of the slurry, the pressure of the slurry, and color or opaqueness of the mixture. The readings of the physical characteristics of the slurry are employed to monitor the yield and control the level of accelerator introduced into the slurry.

Sensor module 118 is communicatively coupled via link 130 to indicator module 132. Indicator module 132 is adapted to receive the readings of physical characteristics from sensor module 118 and to use those readings to monitor and control the yield level. In an exemplary embodiment, indicator module 132 receives the physical characteristics from sensor 118 and calculates a corrected value for conductivity that accounts for the effects of temperature and pressure on the conductivity measurement.

Applicants have determined that a correlation exists between conductivity and yield. Accordingly, using a value for corrected conductivity, indicator module 132 may also calculate a value for yield. Indicator module 132 also determines if the calculated values for corrected conductivity and yield indicate there has been a change in yield due to a change in the level of accelerator. If indicator module 132 determines that there has been a change in yield, it also determines what action, if any, should be taken to account for that change.

Indicator module 132 may operate in two modes—automatic and manual. Indicator module 132 responds differently to a change in yield depending upon its current mode. If indicator module 132 is in "manual" mode and determines that the yield has deviated from the value designated during startup, indicator module 132 provides feedback to the operator to inform the operator of the need to take action to correct for the change in yield. For example, indicator module 132 may activate an LED (Light Emitting Diode) or other visual or audio feedback mechanism that communicates that the yield has changed from a predefined level. In response to the output from indicator module 132, the operator of the system may take the appropriate remedial action such as, for example, manually increasing or decreasing the rate at which accelerator is entered into the slurry. More particularly, the operator may interface with accelerator source 114 to increase or decrease the rate at which accelerator is added to the slurry.

If indicator module 132 is in "automatic" mode and determines that the conductivity value has changed and thereby change the yield, indicator module 132 communicates with accelerator source 114 to increase or decrease the rate at which accelerator is pumped. For example, indicator module 132 may transmit instructions to a pumping device of accelerator source 114 to either increase or decrease the rate of pumping as needed. Indicator module 132 continuously monitors the conductivity readings provided by sensor module 118 and provides feedback instructions to accelerator source 114 as appropriate to maintain the desired level of yield.

As noted above, indicator module 132 also receives readings or measurements from sensor module 118 regarding color and or opacity of the slurry. Indicator module 132 may comprise logic that allows for identification of a color or opacity which indicates the slurry may not be of sufficient quality or grade. Upon detecting a slurry with a color or opacity that is unsatisfactory, indicator module 132 may take a remedial action. For example, indicator module 132 may communicate a warning signal to the operator.

Indicator module 132 may be a specially designed electronic device and/or a general purpose computing device that has been particularly programmed to provide the desired functionality. Communications links 130 and 134 may comprise any communication technology that is suitable to communicate data and signals between devices. Communication links 130 and 134 may comprise, for example, wireline, fiber optic, and/or wireless communication technology. In a particular exemplary embodiment, communications link 130 may be a RS422 communication link.

System 100 may be deployed and operated in any number of work settings and the components of the system located as appropriate to suit the needs of the particular job and operators of the system. For example, in a high rise construction setting wherein system 100 is employed to apply fireproofing material to building supports, slurry source 110 and accelerator source 114 may be located at a significant distance from spray applicator 120. For example, slurry source 110 and accelerator source 114 may be located at ground level while spray applicator 120 may be located at an elevated level of the high rise that is under construction. Likewise, accelerator port 116 and sensor module 118 may be located in relative proximity to spray applicator 120 and away from slurry source 110 and accelerator source 114. Indicator module 132 may be located at any location that is convenient for the operator of system 100. For example, an operator may wish to have indicator module 132 located in proximity to the spray applicator 120. Other operators may choose to have indicator module 132 located in proximity to slurry source 110 and/or accelerator source 114.

It is understood that alterations and modifications may be made to system 100 of FIG. 1. For example, while FIG. 1 illustrates indicator module 132 and sensor module 118 as being separate devices, it is understood that the two modules may be integrated into a single package. Alternatively, the functionality provided by indicator module 132 may be divided and replicated onto a plurality of devices. For example, there may be several devices in communication with sensor module 118 that have the functionality described herein in connection with indicator module 132 of providing feedback to the operating regarding the level of yield.

Figure 2:
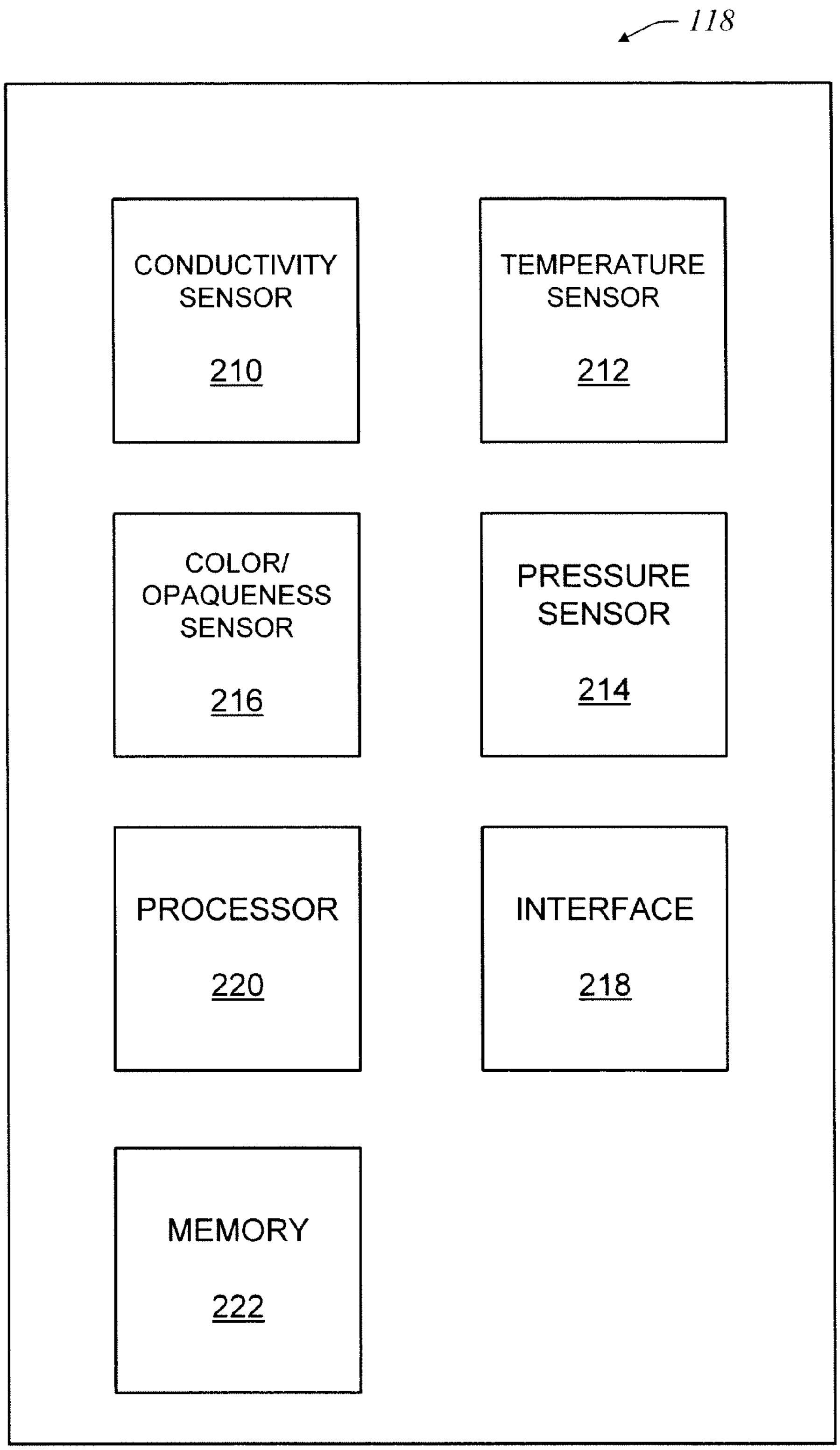
FIG. 2 is a diagram depicting functional components of an exemplary sensor module.

FIG. 2 is a block diagram of functional components comprised in sensor module 118. In an exemplary embodiment, sensor module 118 comprises conductivity sensor 210 that is adapted to measure the conductivity in the slurry. Exemplary sensor module 118 further comprises temperature sensor 212 which is adapted to measure the temperature in the slurry. Pressure sensor 214 is adapted to measure the pressure in the slurry. Color and/or opacity sensor 216 measures the color and/or opacity of the slurry.

Sensor module 118 also comprises communications interface 220. Communications interface 220 is adapted to provide a communications path with indicator module 132 to communicate the measurements taken by sensors 210, 212, 214, and 216. Interface 220 may comprise any technology that is suitable for passing data between sensor module 118 and indicator module 132. For example, interface 220 may comprise wireline, fiber optic, and/or wireless communication technology.

Sensor module 118 further comprises computing processor 220. Computing processor 220 is programmed to control sensors 210, 212, 214, and 216 in order to take measurements and communicate those measurements via communication interface 220 to indicator module 132.

Sensor module 118 may still further comprise computing memory 222. Computing memory 222 may be used to store program instructions for execution by processor 220 and/or to store measurement data collected by sensor module 118. Memory 222 may be any type of computing memory suitable for the particular application. In an exemplary embodiment, memory 222 may be comprised in processor 220.

Figure 3:
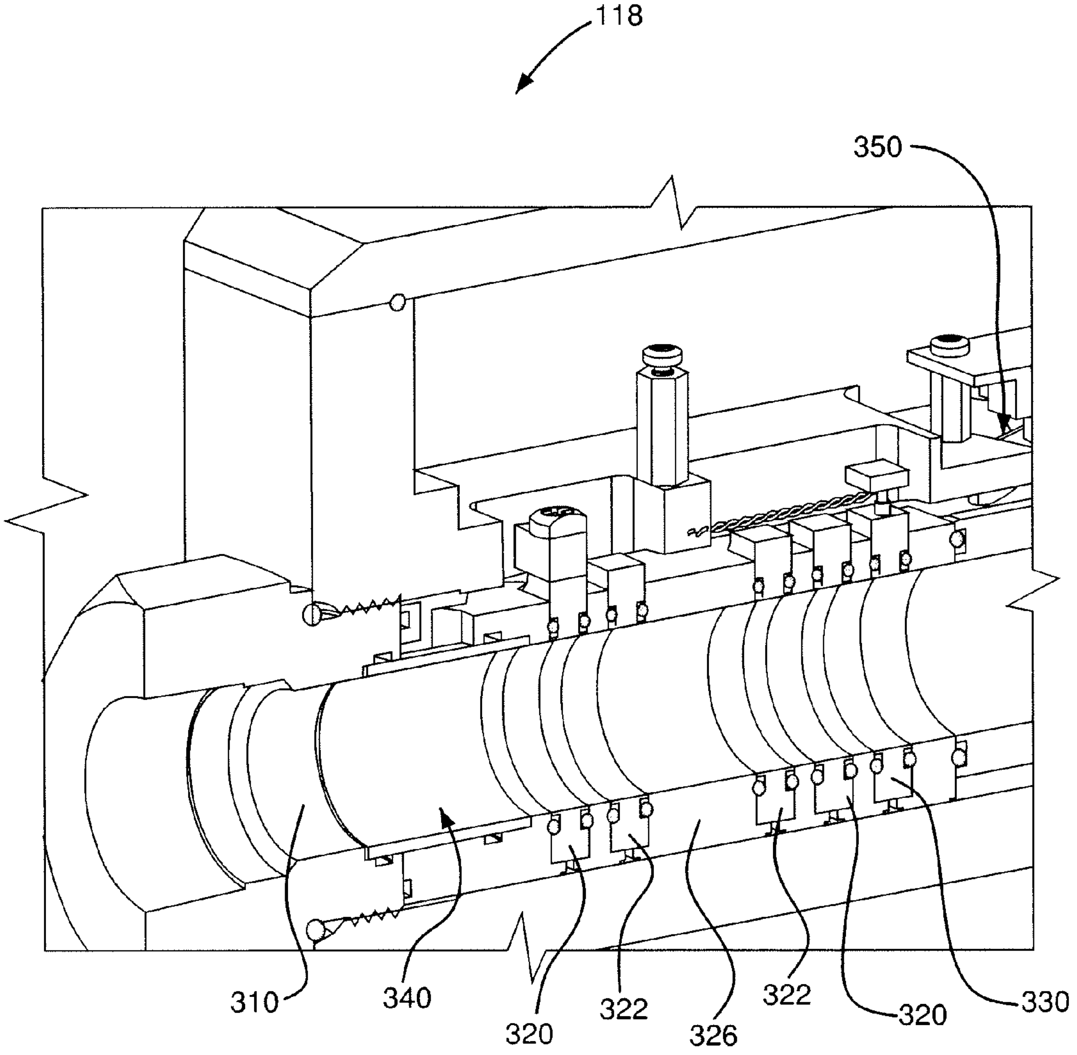
FIG. 3 is a sectional diagram of a portion of an exemplary sensor module.

FIG. 3 is a sectional diagram of a portion of an exemplary embodiment of sensor module 118. An exemplary sensor module 118 comprises sleeve 310 which has a hollowed area adapted to receive a fluid flow. Sleeve 310 is placed in fluid communication with the flow of the slurry as it moves between port 116 and spray applicator 120. Sleeve 310 may be formed of any suitable material such as, for example, metal, plastic, and/or composite material, that is adapted to receive the flow and provide suitable communication between various sensors and the fluid flow.

Comprised in sleeve 310 is a series of devices or sensors adapted to take measurements regarding physical characteristics of the slurry. In an exemplary embodiment, conductivity sensors 320, 322 are adapted to provide a measurement of the conductivity of the slurry flow. In an exemplary embodiment, conductivity sensors 320 are electrically connected to a voltage source and are adapted to create a voltage field within the slurry comprised within sleeve 310. Conductivity sensors 322 are spaced apart from each other but are located between sensors 320. Conductivity sensors 322 are communicatively connected to a metering functionality that is adapted to detect voltage differences between conductivity sensors 320. Sleeve 310 comprises at least a portion 326 that provides physical and electrical isolation between sensors 320, 322.

Sensors 320, 322 may have any shape and composition that is suitable for obtaining a reading of conductivity. In an exemplary embodiment, sensors 320, 322 are formed of a metallic material such as, for example, stainless steel. Exemplary sensors 320, 322 each have an annular body (preferably a hollow cylinder shape) with a bore aligned with and similar diameter with a bore of the sleeve 310 (or nozzle if situated in or in proximity to the nozzle). While electrode shapes such as strips and rectangles can be used as an alternative to an annular, the annular body shape is suitable because some portion of the electrode surfaces come into electrical contact with the slurry thereby providing a reliable conductivity level reading. In addition, an annular shape that is aligned with the internal surface of sleeve 310 (no protruding surfaces relative to the surrounding surfaces) prevents slurry material from accumulating against any protruding electrode surfaces.

Sensor module 118 further comprises temperature sensor 330 devoted to measuring temperature. The temperature sensor 330 may comprise any device that is suitable for measuring temperature. In an exemplary embodiment, temperature sensor 330 comprises a metal portion that is suitable to react to a change in temperature in the slurry. Temperature sensor 330 also may have an annular shape that is positioned in sleeve 310 so that the slurry flows through the annular opening in sensor 330.

Sensor module 118 comprises a pressure sensor 340 devoted to measuring pressure in the slurry flow. In an exemplary embodiment, pressure sensor 340 comprises one or more pressure sleeves that are adapted to provide a measurement of the pressure existing in the slurry flow. In an exemplary embodiment, the pressure sleeves are aligned with the internal surface of sleeve 310 so as to come into contact with the slurry flow.

Sensor module 118 still further comprises one or more optical sensors 350 adapted to measure the opacity and/or the color of the slurry flow. In an exemplary embodiment, three different optical sensors are employed with each of the sensors detecting one of three different color components—green, blue, red.

Figure 4:
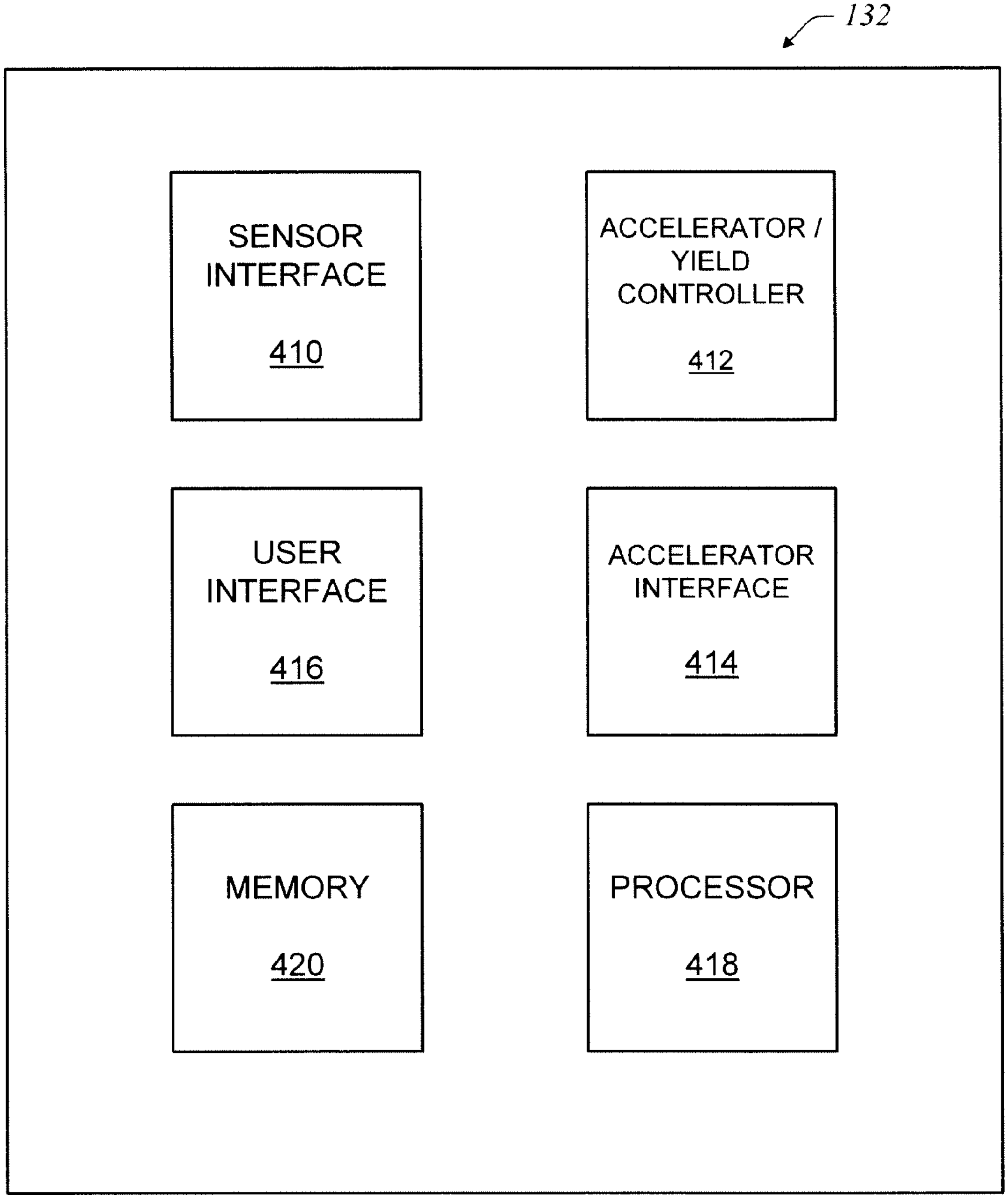
FIG. 4 is a diagram depicting functional components of an exemplary indicator module.

FIG. 4 is a block diagram of functional components comprised in indicator module 132. As shown, indicator module 132 may comprise sensor interface 410. Sensor interface 410 operates as a communication interface with sensor module 118. Sensor interface 410 may comprise any technology suitable for communicating data. For example, interface 420 may comprise wireline, fiber optic, and/or wireless communication technology.

Indicator module 132 further comprises accelerator/yield controller 412. Accelerator/yield controller 412 is adapted to receive the measurements collected by sensor module 118 and perform various control functions using the collected data. As explained below in connection with FIGS. 5 through 8, accelerator/yield controller 412 may calculate corrected values for the conductivity readings, identify a yield level from the corrected conductivity readings, and control the rate at which accelerator is introduced into the slurry to maintain an established level of conductivity and yield. Accelerator/yield controller 412 may further provide feedback to the operator regarding detection of a slurry that lacks a particular color or opacity.

Accelerator interface control 414 is adapted to provide a control mechanism for and communication path to accelerator source 114. For example, interface 414 may be a communication bus and related control logic for communicating control signals to accelerator source 114. In an exemplary embodiment, interface 414 may comprise logic for generating control signals to control a pump associated with accelerator source 114.

User interface control 416 is adapted to control the user interface of indicator module 132. More particularly, interface control 416 may be adapted to receive inputs from the operator of the system and to communicate outputs to the user. As explained in connection with an exemplary embodiment disclosed in FIG. 5, indicator module 120 comprises various buttons for receiving inputs and various light emitting diodes (LEDs) for presenting information to users. Additionally, indicator module 132 may comprise speakers to provide audible feedback. User interface control 416 is adapted to control such interfaces.

Indicator module 120 further comprises computing processor 418. Computing processor 418 may be one or more processors that may be programmed with instructions to control and/or operate sensor interface 410, accelerator controller 412, accelerator interface 414, and/or user interface 416.

Indicator module 120 further comprises computing memory 420. Memory 420 may be used to store system parameters and program instructions for execution by processor 418. Memory 420 may further store data collected by and received from sensor module 118. Still further, memory 420 may store values such as corrected conductivity and yield that are calculated by indicator module 120. Memory 420 may be any type of electronic memory that is suitable for providing the storage functions of indicator module 132. In an exemplary embodiment, memory 420 may comprise a removable storage medium such as, for example, a flash memory.

Figure 5:
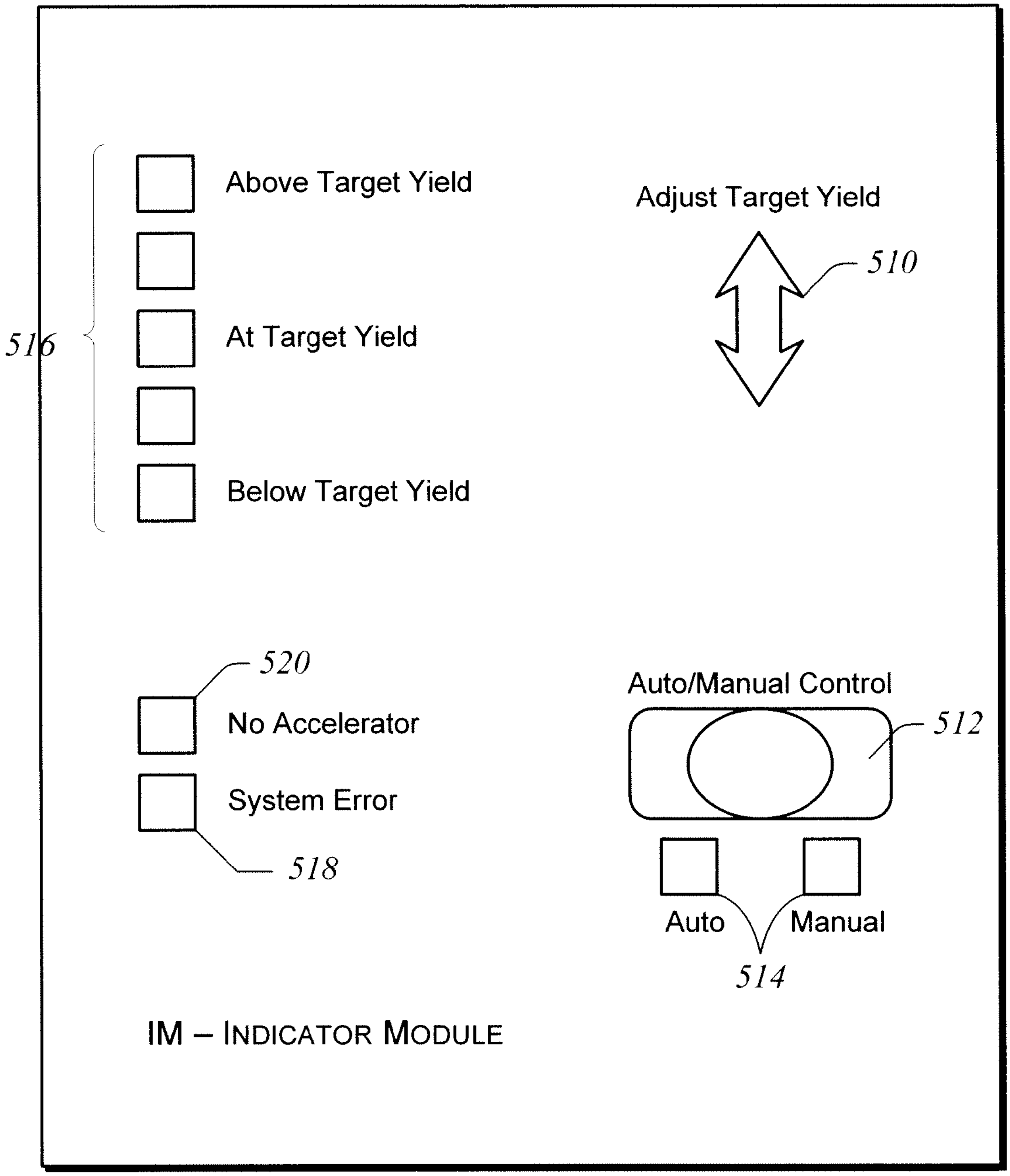
FIG. 5 is a diagram depicting a user interface of an exemplary indicator module.

FIG. 5 is a diagram depicting an exemplary operator interface of indicator module 132. As shown, an exemplary embodiment of indicator module 132 comprises target yield adjustment button 510. Target yield adjustment button 510 is used during system startup to adjust the yield of the output to a desired level. The operators of the system measure the yield of the system using accepted methods. The operators may then adjust the yield by depressing target yield adjustment button 510. In response to inputs depressing target yield button 510, indicator module 132 communicates with accelerator source 114 to increase or decrease as necessary the rate at which accelerator introduced into the slurry. The amount that the rate of accelerator entry is incremented or decremented with each push of yield adjustment button 510 is associated with a value stored in memory and in an exemplary embodiment may be changed by the operator during system initialization. As the rate of entry of accelerator is increased and/or decreased, the amount of accelerator in the slurry changes which has the effect of changing the yield.

Indicator module 132 further comprises auto/manual control button 512. Auto/manual control button 512 is used to toggle indicator module 132 between an automatic mode and manual mode. Mode indicator lights 514, which may comprise for example, light emitting diodes, are labeled "Auto" and "Manual" to identify the current operating mode. When indicator module 132 is in automatic feedback mode, indicator light 514 corresponding to "Auto" operation is turned on. Similarly, if indicator module 132 is in manual feedback mode, indicator light 514 corresponding to "Manual" operation is turned on.

When in the automatic mode, indicator module 132 attempts to automatically maintain the yield of the slurry at the particular level as designated by the operator during startup. When in manual mode, indicator module 120 detects when the yield deviates from the level established during startup and provides an indication of the level to the operator using, for example, target feedback LEDs 516. As shown, in an exemplary embodiment, feedback LEDs 516 are labeled "Above Target Yield," "At Target Yield," and "Below Target Yield." The LED's are activated and deactivated as necessary to provide an indication of the current level of the yield. For example, if indicator module 132 determines that the yield has drifted above the operator-established yield, the target feedback LED 516 that corresponds to the text "Above Target Yield" is turned on and the others turned off. If indicator module 132 determines that the yield has drifted below the user-selected yield, the target feedback light 516 that corresponds to the text "Below Target Yield" is turned on. If indicator module 132 determines that the yield is at the operator-established yield, the target feedback light 516 that corresponds to the text "At Target Yield" is turned on.

Indicator module 132 further comprises system error light 518 and accelerator warning light 520. If indicator module 132 detects an error in its operation, system error light 518 is activated, i.e. turned on. For example, if indicator module 132 determines that the color or opacity of the slurry are unacceptable, indicator module 132 may activate error LED 518. If indicator module 132 receives an indication or determines that there is little or no accelerator in the slurry, accelerator warning light 520 is activated.

Method for Monitoring and Controlling Yield

Figure 6:
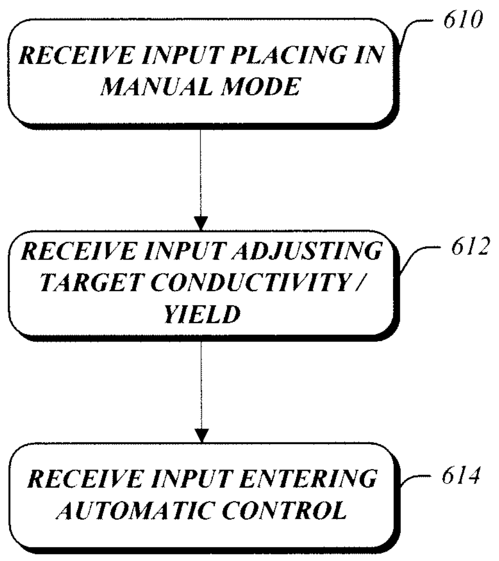
FIG. 6 is a flow diagram depicting a process for initializing an exemplary system.

FIG. 6 is a flow diagram depicting a start-up process for yield manager system 100. As shown, at step 610 indicator module 132 receives an input placing the system in manual mode. In an exemplary embodiment, an input may be received as a result of the operator depressing auto/manual control button 512. Mode indicator LEDs 514 corresponding to manual mode is activated.

While the system is in manual operating mode, the operator may depress target yield button 510 to provide an indication that it is desired to either increase or decrease the yield. The operator may determine that it is desired to increase and/or decrease the yield by manually measuring the yield of the system using accepted techniques. For example, an operator will operate the spray equipment until a desired yield level is achieved by the slurry when spray-applied and set upon a substrate surface such as a steel beam or panel. The yield measurement of commercial fireproofing slurries, such as W. R. Grace's MONOKOTE product, is typically done by measuring cup weight a known volume of slurry exiting from the nozzle spray-orifice. When a desired cup weight yield (i.e., density) is obtained at the nozzle for a given level of set accelerator introduced into the hose (via accelerator injector port 116), slurry conductivity as determined by sensor module 118 can be correlated with a desired yield.

Upon receiving operator inputs via target yield button 510, indicator module 132 communicates with accelerator source 114 to increase or decrease the rate at which accelerator is added to the slurry. Increasing the rate at which accelerator is added to the slurry has the effect of increasing the yield. Decreasing the rate at which accelerator is added to the slurry has the effect of decreasing the yield. Indicator module 132 maintains in memory a value for conductivity and yield corresponding to the inputs of the operator during start-up.

While in manual operating mode, indicator module 132 provides an indication of whether the yield has moved above or below the target level as determined by the operator using target yield adjustment button 510. Target feedback lights 516 are controlled by indicator module 132 to provide feedback to the operator regarding whether the yield has moved above or below the level established by the operator through manual control of adjust target yield button 510. The operator may respond to the outputs of indicators 516 by manually adjusting the rate at which accelerator is pumped into the slurry.

The operator may change operating modes from manual mode to automatic mode by depressing auto/manual control button 512. Upon receiving an indication that auto/manual control button 512 has been depressed, indicator module 132 identifies the current operating characteristics of the slurry. In particular, indicator module 132 receives current operating characteristics from sensor module 118 including, for example: conductivity; temperature; pressure; and color/opacity. Indicator module 132 calculates a corrected conductivity that accounts for the effect of pressure and temperature on conductivity measurements. In an exemplary embodiment, indicator module 132 corrects for the effect of temperature and pressure on conductivity measurements. An exemplary method for correcting conductivity is described below in connection with FIG. 9.

Upon entering "automatic' mode, indicator module 132 also calculates a value for yield using the corrected conductivity value. A correlation exists between corrected conductivity and yield. Accordingly, using the corrected conductivity, indictor module 132 determines a corresponding yield. In an exemplary embodiment, a linear correlation is employed to determine yield from a corrected conductivity value. In particular, a value for yield is calculated as follows:

$$\text{Yield}=(m*CC_{tp})+b,$$

where $CC_{tp}$ is the conductivity of the slurry corrected for temperature and pressure as described below in connection with FIG. 9 and m and b are constants that depend upon the particular slurry and operating environment. The values for yield and conductivity established during set-up are stored for later reference during operation of the system.

While the system remains in automatic mode, indicator module 132 attempts to maintain the corrected conductivity and yield that existed when the automatic mode was entered. If the corrected conductivity deviates from the level established upon entry into the auto mode, indicator module 132 corrects for the deviation by controlling accelerator source 114 to increase or decrease, as appropriate, the rate at which accelerator is input into the slurry.

Figure 7:
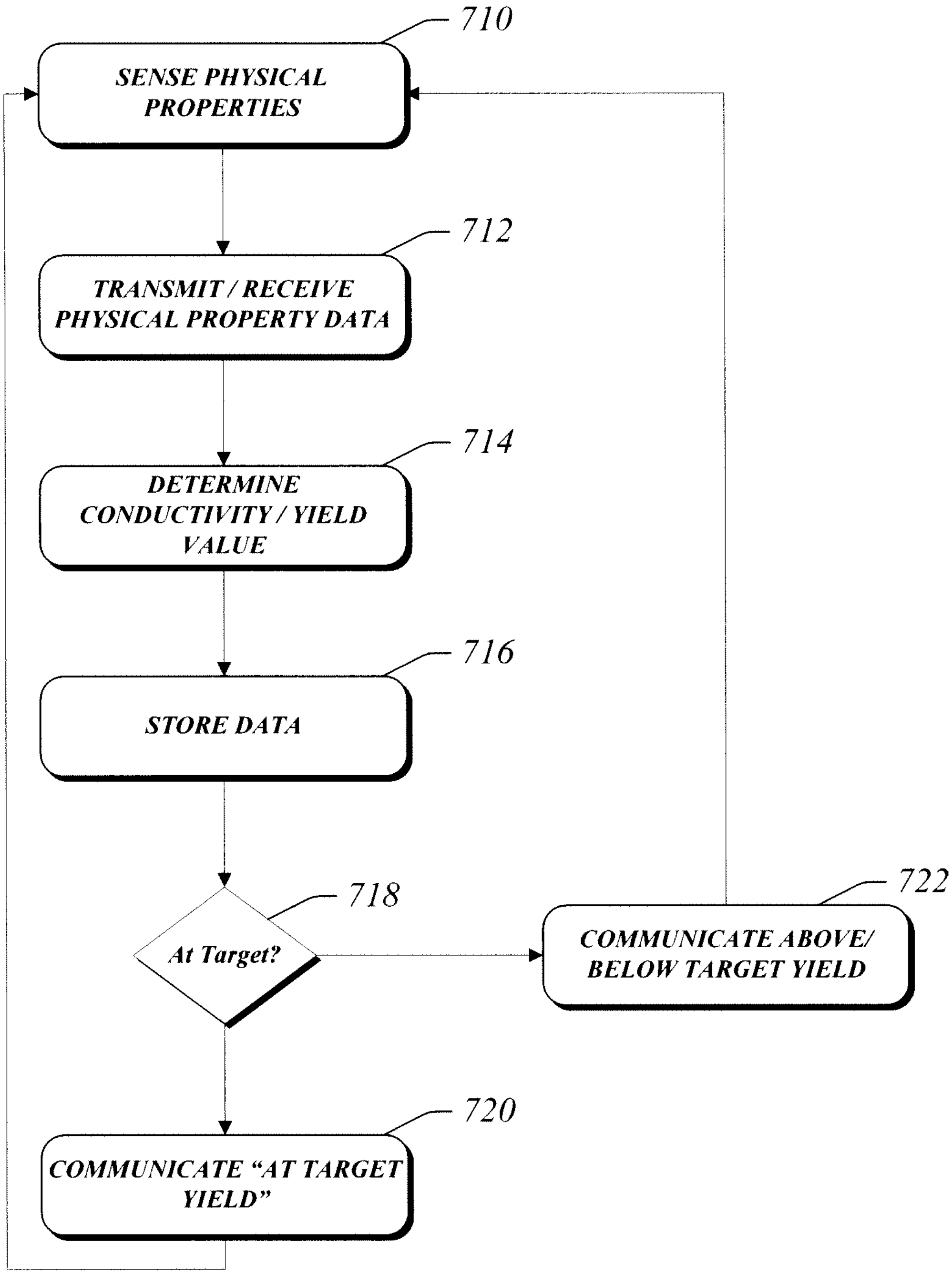
FIG. 7 is a flow diagram depicting a process for manual control of the yield.

FIG. 7 provides a flow diagram of the operation of system 100 while in the manual mode of operation. As shown, at step 710 sensor module 118 measures physical properties of the slurry. In an exemplary embodiment, sensor module 118 takes measurements of the conductivity, temperature, and pressure of the slurry. Sensor module 118 may also take measurements as to the color and/or opaqueness of the slurry. The measurements are taken repeatedly at short intervals. As the readings corresponding to the physical characteristics are taken, they may be stored in memory 222.

At step 712, the measurements are transmitted to and received at indicator module 132. As new measurements are taken by sensor module 118, they are transmitted to and received at indicator module 132.

At step 714, indicator module 132 determines a value for corrected conductivity of the slurry using the slurry measurement data. Generally, the conductivity readings made by sensor module 118 may be effected by changes in various operating conditions. For example, the conductivity may be affected by the temperature and the pressure that exists in the slurry. Thus, while the conductivity of the slurry may have changed, the change may have been the result of pressure and/or temperature and not due to an increase in the level of accelerator in the slurry. Thus, at step 714, an exemplary system accounts for changes in these operating characteristics in its assessment of the conductivity of the of the slurry. More particularly, indicator module 132 calculates a corrected conductivity value that corrects for variations in environmental conditions such as temperature and pressure. An exemplary method for calculating a corrected conductivity is described below in connection with FIG. 9. Indicator module 132 may further calculate a yield value based on the corrected conductivity value. The yield value is determined based upon the correlation between corrected conductivity and yield as described above. In an exemplary embodiment, calculating a yield value based on the corrected conductivity value may comprise calculating an average of yield values over a period of time.

At step 716, indicator module 132 stores data relevant to its operation. For example, an exemplary indicator module may store the operating characteristics (e.g., conductivity, temperature, pressure, color) that it receives from sensor module 118. Additionally, calculated values for corrected conductivity and yield levels may be stored by indicator module 132. The data may be stored along with the time to which the data is relevant. Storing the data along with time allows for creating a temporal plot of the data.

At step 718, indicator module 132 determines whether the yield as determined from the corrected conductivity is at the level identified by the operator during startup using target yield adjustment button 510. At step 718, indicator module 132 may compare the value for yield to the value for yield specified during start-up.

If at step 718 it is determined that the current reading for yield has not changed from the conductivity level specified during start-up, at step 720 indicator module 132 provides feedback to the operator to indicate that the conductivity and correlated yield are at the level defined during system initialization. In an exemplary embodiment, indicator module 132 provides feedback by activating the appropriate one of target feedback LEDs 516. In particular, module 132 activates the LED indicating the output is "At Target Yield."

If at step 718 it is determined that the current reading for corrected conductivity of the slurry is not at a level that indicates the yield is consistent with the level identified by the operator during startup, at step 722 indicator module 132 communicates that the yield is above or below the target yield. In an exemplary embodiment, module 132 provides feedback by activating the appropriate target feedback LEDs 516. In particular, the appropriate target feedback LED 516 is activated to indicate the output is either "Below Target Yield" or "Above Target Yield." Indicator module 132 may further provide audio feedback. For example, indicator module 132 may sound an alarm if the corrected conductivity reading is too high or low for a period of time.

In response to outputs on LEDs 516 that the yield is above or below the target yield, the operator may manually adjust the accelerator to either increase or decrease its flow as appropriate. Processing and sensing of conductivity continues at step 710.

While not specifically called out in the diagram of FIG. 7, indicator module 132 is also adapted to receive measurements of slurry opacity/color from sensor module 118. Indicator module 132 may compare the readings with established values that may be stored in memory. If the measured values do not correspond to the previously established values in memory, indicator module 132 may take appropriate action which may include, for example, providing a visual indicator of the discrepancy, providing an audible indicator such as sounding an alarm, or, taking action to change the makeup of the slurry. In an embodiment, indicator module 132 may cease operating if the color indicates the slurry is unacceptable.

Figure 8:
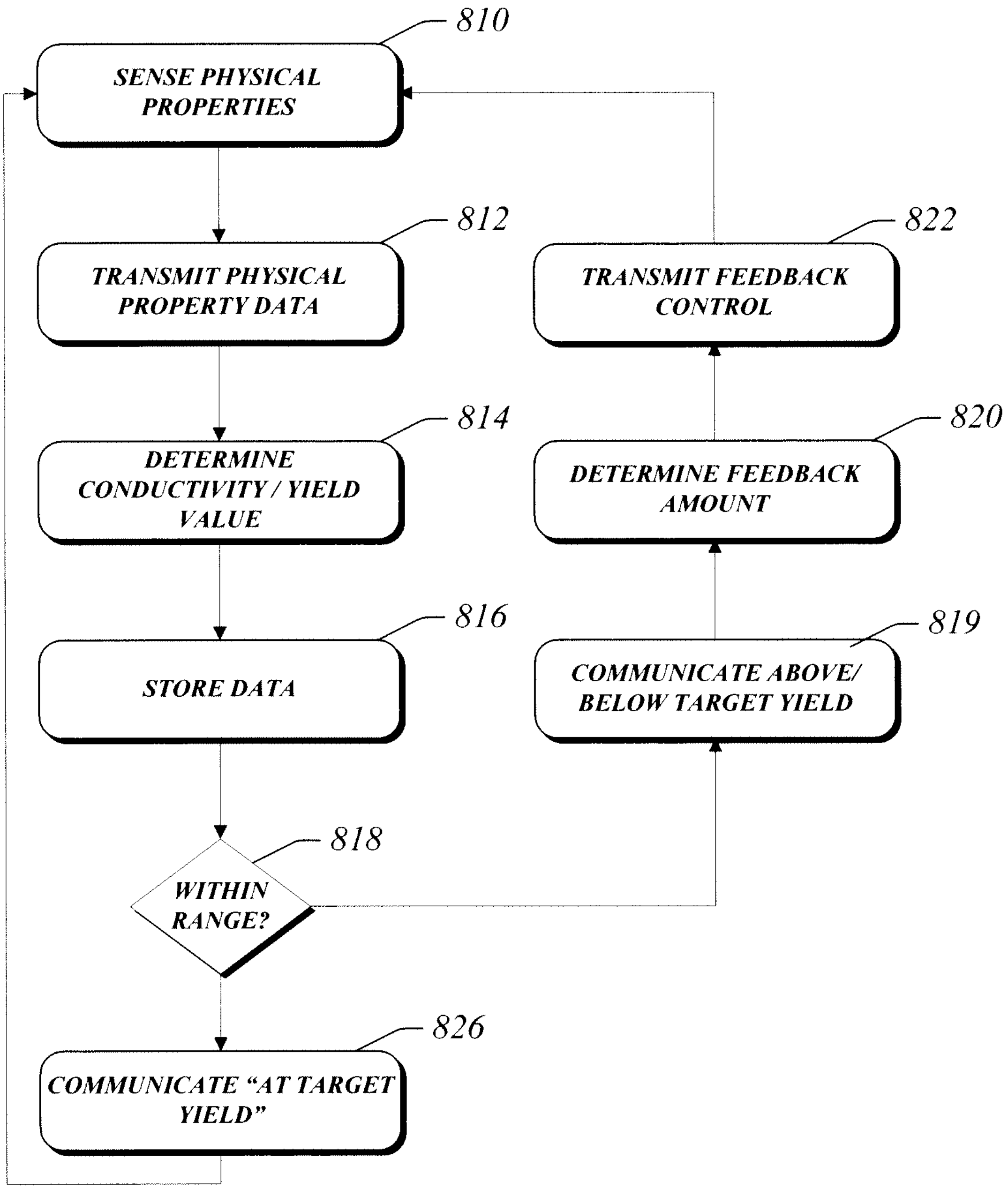
FIG. 8 is a flow diagram depicting a process for automated control of the yield.

FIG. 8 depicts a process implemented by the system while in "Automatic" mode. Steps 810 through 818 are analogous to respective steps 710 through 718 described above in connection with "Manual" mode of operation.

As shown, at step 810 sensor module 118 measures physical properties of the slurry. In an exemplary embodiment, sensor module 118 takes measurements of the conductivity, temperature, and pressure of the slurry. Sensor module 118 may also take measurements as to the color and/or opaqueness of the slurry. The measurements are taken repeatedly at short intervals. As the readings corresponding to the physical characteristics are taken, they may be stored in memory 420.

At step 812, the measurements are transmitted to and received at indicator module 132. As new measurements are taken by sensor module 118, they are transmitted to and received at indicator module 132.

At step 814, indicator module 132 determines a value for corrected conductivity of the slurry using the slurry measurement data. Generally, the conductivity readings made by sensor module 118 may be effected by changes in various operating conditions. For example, the conductivity may be effected by the temperature and the pressure that exists in the slurry. Thus, while the conductivity of the slurry may have changed, the change may have been the result of pressure and/or temperature and not due to an increase in the level of accelerator in the slurry. Thus, at step 814, an exemplary system accounts for changes in these operating characteristics in its assessment of the conductivity of the of the slurry. More particularly, indicator module 132 calculates a corrected conductivity value that corrects for variations in environmental conditions such as temperature and pressure. An exemplary method for calculating a corrected conductivity is described below in connection with FIG. 9.

At step 816, indicator module 132 stores data relevant to its operation. For example, an exemplary indicator module may store the operating characteristics (e.g., conductivity, temperature, pressure, color) that it receives from sensor module 118. Additionally, calculated values for corrected conductivity and yield levels may be stored by indicator module 132. The data may be stored along with the time to which the data is relevant. Storing the data along with time allows for creating a temporal plot of the data.

At step 818, indicator module 132 determines whether the yield (determined using the value of corrected conductivity of the slurry) is at the level identified by the operator using target yield adjustment button 510. For example, at step 718, indicator module 132 may compare the value for yield calculated using the corrected conductivity to the value for yield specified during start-up.

If at step 818, indicator module 132 determines that the yield is at the desired level, at step 826 indicator module 132 provides feedback to the operator to indicate that the conductivity and correlated yield are at the level defined during system initialization. In an exemplary embodiment, indicator module 132 provides feedback by activating the appropriate one of target feedback LEDs 516. In particular, module 132 activates the LED indicating the output is "At Target Yield." Thereafter, processing continues at step 810.

However, if at step 818 indicator module 132 determines that yield is not at the desired level, at step 819 indicator module 132 communicates that the yield is above or below the target yield. In an exemplary embodiment, module 132 provides feedback by activating the appropriate target feedback LEDs 516. In particular, the appropriate target feedback LED 516 is activated to indicate the output is either "Below Target Yield" or "Above Target Yield." Indicator module 132 may further provide audio feedback. For example, indicator module 132 may sound an alarm if the corrected conductivity reading is too high or low for a period of time.

At step 820 indicator module 132 determines an amount by which to change the rate at which accelerator is added to the slurry in order to bring the yield closer to the level established during startup. Any method may be used for determining an amount by which to change the rate for adding accelerator. In an exemplary embodiment, a proportional integral derivative (PID) control algorithm is employed to determine an amount by which to change the rate of accelerator input. For example, in an exemplary embodiment, the following equation may be employed to determine the amount by which to adjust the rate of accelerator input:

$$PID\ \text{Output} = PID\ \text{Output}_{cur} + (K_p + k_{int} + K_{der}) * \text{error}_{n0} - (k_p + 2 * k_{der}) * \text{error}_{n1} + (k_{der} * \text{error}_{n2}),$$

where PID $\text{Output}_{cur}$ is the current value corresponding to the current rate of pumping accelerator into the slurry; $K_p$ is the proportional constant of the PID algorithm which in an exemplary embodiment has a value of 1.0; $k_{int}$ is the integral constant of the PID algorithm which in the exemplary embodiment has a value of 0.05; $K_{der}$ is the derivative constant of the PID algorithm which in an exemplary embodiment has a value of 0; $\text{error}_{n0}$ is equal to the difference between the current measurement of the conductivity of the slurry and the target level of conductivity, $\text{error}_{n1}$ is equal to the previous value of $\text{error}_{n0}$; and $\text{error}_{n1}$ is equal to the previous value of $\text{error}_{n1}$.

At step 822, indicator module 132 communicates control signals to accelerator source 114 in order to increase or decrease the rate at which accelerator is input into the slurry flow. In an exemplary embodiment, indicator module 132 is in communication with a pump that controls the rate at which accelerator is entered into the slurry. In such an exemplary embodiment, at step 822, indicator module 132 communicates with the pump of accelerator source 114 to increase or decrease the rate of entry of accelerator into the slurry.

While not specifically called out in the diagram of FIG. 8, indicator module 132 is also adapted to receive measurements of slurry opacity/color from sensor module 118. Indicator module 132 may compare the readings with established values that may be stored in memory. If the measured values do not correspond to the previously established values in memory, indicator module 132 may take appropriate action which may include, for example, providing a visual indicator of the discrepancy, providing an audible indicator such as sounding an alarm, or, taking action to change the makeup of the slurry. In an embodiment, indicator module 132 may cease operating if the color indicates the slurry is unacceptable.

Figure 9:
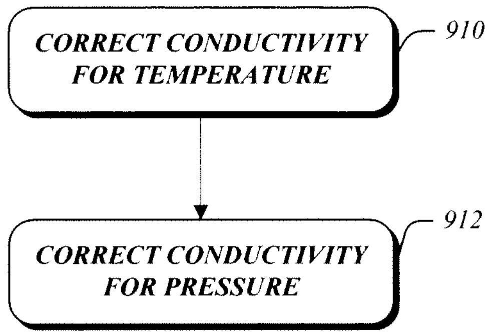
FIG. 9 is a flow diagram depicting a process for calculating a corrected conductivity.

FIG. 9 provides a diagram depicting a process by which indicator module 132 determines a corrected conductivity that accounts for the effect of the operating environment for the conductivity measurements. More particularly, in an exemplary environment, indicator module 132 accounts for the effect of temperature and pressure on its measurement of conductivity. As shown in FIG. 9, at step 910 indicator module 132 corrects for the effect of temperature on the conductivity reading. In an exemplary environment, indicator module uses the following equation in its correction for temperature:

$$CCt=(100/(100+\theta*(\text{temperature}-25)))*C_m,$$

wherein $CC_t$ is the conductivity corrected for temperature, θ is constant associated with the particular slurry and accelerating agent; and $C_m$ is the measured conductivity.

At step 912, indicator module 132 corrects for the effect of pressure on the current conductivity reading. In an exemplary environment, indicator module uses the following equation in its correction for temperature:

$$CC_{tp}=CC_t+(P_m*-0.0281)+2.81$$

wherein $CC_{tp}$ represents the conductivity corrected for temperature and pressure, $CC_t$ is the measured conductivity corrected for temperature, and $P_m$ is the measured pressure.

Thus, indicator module 132 arrives at a corrected conductivity value that accounts for environmental circumstances under which the conductivity measurement was made. In particular, indicator module 132 arrives at a value that corrects for the effects of temperature and pressure on the conductivity measurement. As described above in connection with FIGS. 7 and 8, the corrected conductivity value is employed to determine whether or not the yield deviates from an operator defined level. Indicator module 132 is adapted to control the rate at which accelerator is added to the slurry so as to bring the yield to the level established by the operator.

Additional embodiments for monitoring and controlling slurry compositions are are envisioned. For example, in further exemplary embodiments, sensor module 118 may comprise a pH sensor which is operative to detect levels of acidic set accelerator injected into the slurry. Other sensors may be employed, such as ultrasonic, optical, and capacitive sensors.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as any other machine-readable storage medium wherein, when the program code is loaded into and executed by a machine, such as a computing processor, the machine becomes an apparatus for practicing the subject matter described herein.

Although example embodiments may refer to utilizing aspects of the subject matter described herein in the context of one indicator module 132, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. For example, the functionality to receive measurements from sensor module 118 may be available at a plurality of devices. Such devices might include personal computers, hand-held computing systems, and/or PDAs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for applying a settable slurry, comprising:
conveying a slurry through a conduit;
introducing an accelerating agent into the slurry to form a slurry mixture;
measuring conductivity and pressure associated with the slurry mixture; and
determining a corrected conductivity as a function of the measured conductivity and the measured pressure associated with the slurry mixture.

2. The method of claim 1, further comprising measuring temperature associated with the slurry mixture;
wherein determining a corrected conductivity comprises calculating a corrected conductivity as a function of measured temperature.

3. The method of claim 2, wherein determining a corrected conductivity comprises calculating a corrected conductivity according to the equation $$CC_t=(100/(100+\theta*(temp_m-25)))*C_m,$$

wherein $CC_t$ is the conductivity corrected for temperature, $temp_m$ is the measured temperature, θ is a constant associated with the slurry; and $C_m$ is the measured conductivity.

4. The method of claim 3, wherein the value for 0 is approximately 0.52.

5. The method of claim 3, wherein determining a corrected conductivity further comprises calculating a corrected conductivity according to the equation $$CC_{tp}=CC_t+(P_m*-0.0281)+2.81,$$

wherein $CC_{tp}$ represents the conductivity corrected for temperature and pressure, $CC_t$ is the measured conductivity corrected for temperature, and $P_m$ is the measured pressure.

6. The method of claim 1, further comprising deriving a value for yield of the slurry from the corrected conductivity.

7. The method of claim 6, wherein deriving a value for yield of the slurry from the corrected conductivity comprises determining a value for yield corresponding to the corrected conductivity in a mathematical relationship between yield and corrected conductivity.

8. The method of claim 7, wherein determining a value for yield corresponding to the corrected conductivity in a mathematical relationship between yield and corrected conductivity comprises determining a value for yield corresponding to the corrected conductivity in a linear mathematical relationship between yield and corrected conductivity.

9. The method of claim 6, wherein deriving a value for yield of the slurry from the corrected conductivity comprises calculating a value for yield according to the equation $$\text{Yield}=m*CC_{tp}+b,$$

wherein $CC_{tp}$ is conductivity corrected for pressure, m and b are constants associated with the slurry.

10. The method of claim 6, further comprising changing a rate of introducing the accelerating agent into the slurry depending upon the derived value for yield.

11. The method of claim 10, further comprising:
measuring color associated with the slurry mixture; and
modifying the flow of slurry depending upon the measured color.

12. The method of claim 1, wherein measuring conductivity and pressure associated with the slurry mixture comprises measuring conductivity and pressure of the slurry mixture in a conduit.

13. A method for applying a fireproofing material slurry, comprising:
providing a fireproofing material slurry;
introducing an accelerator agent into the fireproofing material slurry to form a fireproofing material slurry mixture;
measuring the conductivity and the pressure of the fireproofing material slurry mixture;
determining a corrected conductivity of the fireproofing material slurry mixture as a function of the measured conductivity and measured pressure of the fireproofing material slurry mixture.

14. The method of claim 13, further comprising deriving a yield value from the corrected conductivity of the fireproofing slurry mixture, wherein the yield value represents the volume of applied fireproofing slurry, after setting, per given weight of dry mix used to prepare the fireproofing material slurry.

15. The method of claim 14, further comprising changing a rate of introducing the accelerating agent into the slurry depending upon the derived yield value.

* * * * *